UNITED STATES PATENT OFFICE.

THE UNION PAPER COLLAR COMPANY, ASSIGNEES, BY MESNE ASSIGNMENTS, OF WALTER HUNT.

IMPROVEMENT IN SHIRT-COLLARS.

Specification forming part of Letters Patent No. 11,376, dated July 25, 1854; Reissue No. 1,927, dated April 4, 1865; Reissue No. 2,306, dated July 10, 1866.

DIVISION A.

*To all whom it may concern:*

Be it known that WALTER HUNT, of the city, county, and State of New York, did invent certain new and useful Improvements in Shirt-Collars; and I do hereby declare that the following is a full, clear, and exact description of the same.

The invention of the said HUNT consisted of a shirt-collar composed of paper and muslin, or its equivalent, so combined and so polished or burnished that the collar shall not be readily torn or broken at the parts subjected to the greatest strain, shall be sufficiently elastic, shall have the whiteness and brilliancy of the most carefully-dressed linen collar, for which the improved collar forms a cheap substitute.

White paper properly prepared presents a more smooth and glossy surface, and one which is less liable to attract dust and dirt and absorb perspiration and other moisture, than the most carefully-starched linen. With a full knowledge of these facts the said WALTER HUNT determined to apply this smooth and polished white paper to the manufacture of shirt-collars, shirt-bosoms, and other articles of wearing-apparel with the view of substituting the cheaper paper article for the more expensive one of linen, and of saving the time occupied and wear and tear which takes place in washing, starching, and ironing the ordinary linen.

The fragile nature of paper, its liability to crack and to tear at the button-holes, rendered it necessary to stiffen it and make it more tough and elastic by combining it with textile fabrics or submitting it to other stiffening or strengthening processes. The said HUNT took sheets of thin white paper, and by means of paste, glue, or other appropriate sizing secured one sheet of paper to one side and the other to the opposite side of thin white cotton muslin or other textile fabric or fibrous material not readily torn. The fabric was then polished and rendered more stiff and elastic by subjecting it to the action of calender-rollers, rubbing it with an agate burnisher or other suitable means. The collars or other articles of wearing-apparel were then cut or stamped out, and were made in one piece or in two or more pieces, the separate portions being afterward glued or pasted together, and finally provided with suitable button-holes. The collar thus formed was covered with a suitable coating of enamel for the purpose of giving to the fabric of said collar a smooth and polished surface resembling laundry-dressed linen.

Among the advantages which the improved collars present are the following:

First, they have a smooth, glossy, and pure white surface.

Second, they can be worn much longer than ordinary laundry-dressed linen collars.

Third, they may be made and sold at a price less than the cost of washing, starching, and dressing linen collars.

The invention has been alluded to as particularly applicable to shirt-collars, but it is evident that it is equally well adapted to shirt-bosoms, wristbands, &c.

What is claimed as the invention of the said WALTER HUNT, and desired to be secured under this Patent as a new article of manufacture, is—

A shirt-collar or wristband or bosom made of a fabric composed of paper and muslin, or an equivalent fabric, having a surface covered with enamel, substantially as and for the purpose above specified.

UNION PAPER COLLAR COMPANY,
By JAMES A. WOODBURY, *President.*

Witnesses:
A. B. STOUGHTON,
JOHN S. HOLLINGSHEAD.